Patented Oct. 8, 1940

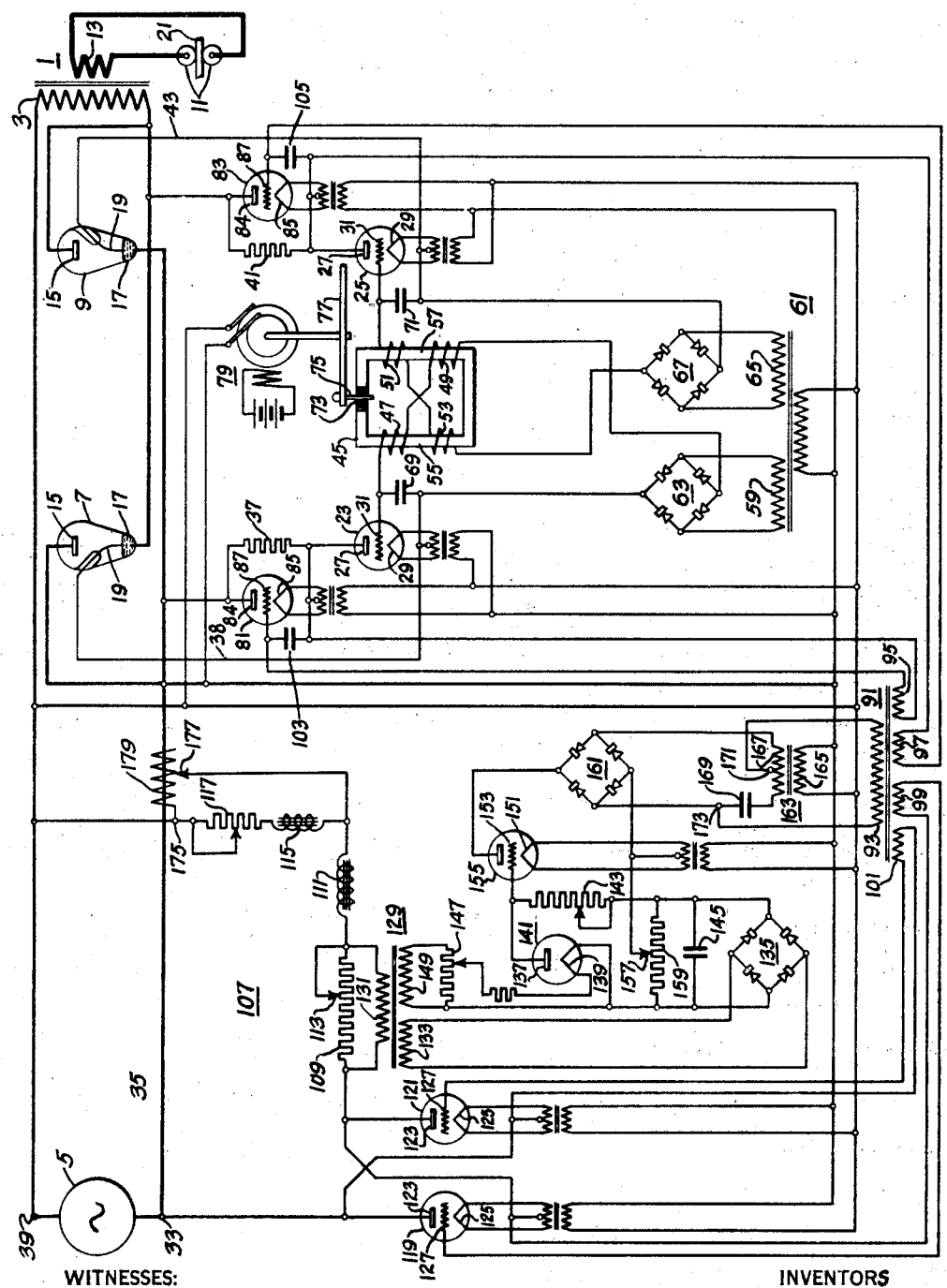

2,217,476

UNITED STATES PATENT OFFICE 2,217,476

ELECTRIC DISCHARGE APPARATUS

Finn H. Gulliksen, Wilkinsburg, and John W. Dawson, East McKeesport, Pa., assignors to Westinghouse Electric & Manufacturing Company, East Pittsburgh, Pa., a corporation of Pennsylvania Application September 5, 1936, Serial No. 99,676

26 Claims. (Cl. 219—4)

Our invention relates to electric discharge apparatus and has particular relation to automatic resistance welding arrangements or similar equipment in which a load is supplied intermittently with current of considerable magnitude.

In resistance welding apparatus, the welding current is supplied through electric discharge valves preferably of the Ignitron tube type. The valves are energized from an alternating current source and the current supplied to produce the welds is measured out at time intervals in successive half cycles of the source in accordance with the requirements of the material welded as to the number and the spacing of the welds. The magnitude of the current supplied to each weld is moreover controlled by determining the phase points in the successive half cycles of potential of the source at which the current transmitted through the valves is initiated. Zero current gaps of variable length are thus inserted between successive half cycles of current. By proper adjustment of the number of half cycles of welding current supplied and the phase point in each half cycle at which the current conduction is initiated, the heat energy supplied to each weld may be precisely determined. Precision is, in general, essential since too great a current flow produces a burned spot in the welded material and too small a current flow fails to properly fuse the material to be welded. In either case, an imperfect weld is produced and a region is formed in the material at which a dangerous rupture may be started.

While the control of the welding heat by controlling the number of half cycles of the welding current supplied and the phase point in each of the line potential cycles at which the current supply is initiated has proved satisfactory in many welding applications, difficulty has been encountered in one respect. Customarily, the discharge valves and the welding circuit are supplied from an ordinary commercial power source. It is a well known fact that such a power source is subject to both periodic and random fluctuations which may be of considerable magnitude. In the past, fluctuations of this type have produced undesired disturbances in the welding processes. Where fluctuations have occurred, adjustment of the number of half cycles of welding current and the phase point in each half cycle at which the current supply is initiated has proved insufficient. The fluctuations in the source potential have produced such changes in the actual current supplied to the material to be welded that the actual welding heat has become either so large that the material was burned or so small that the material was not properly fused.

On its face, a problem of the type that is involved here would appear to be most satisfactorily solved by providing a suitable regulating means. However, the provision of regulating apparatus is not at all a simple matter in the present case. One difficulty arises from the fact that the welding current is supplied intermittently and not continuously. The current may be supplied either during periodic intervals or at random. To properly solve the problem which is involved here, the system must operate in such manner that regardless of when the current is initiated, it is always independent of the potential fluctuations of the source. The situation is further complicated by the fact that the welding current is of considerable magnitude and when the current flow is initiated, the power source is heavily loaded and the source potential fluctuates vigorously. Satisfactory regulating apparatus must necessarily distinguish fluctuations of this type from fluctuations arising in the source from external causes.

It is accordingly an object of our invention to provide, for a resistance welding system or the like in which the load current is supplied intermittently either in periodic or random intervals, apparatus for maintaining the load current independent of source fluctuations.

Another object of our invention is to provide apparatus for supplying a load of the type that draws power intermittently with current that is maintained at a predetermined value independently of the fluctuations in the potential of the source.

A further object of our invention is to provide for a load of the type that is supplied intermittently from a source and that in turn influences the source regulating apparatus that shall operates independently of the fluctuations produced in the source by the variations in load current.

An additional object of our invention is to provide apparatus, for regulating the current flow to a system of the type including discharge devices for general control purposes, in which the discharge devices shall also be utilized for regulating purposes.

More generally stated, it is an object of our invention to provide apparatus for supplying a load having variable requirements from a source in such manner as to suppress variations in the load current that may arise from fluctuations in the source.

In accordance with our invention, we provide a network having properties corresponding to those of the load. Such a network may be designated as a dummy load and may be provided with a reactance and a resistance corresponding to the reactance and resistance of the main load. The dummy load is continuously supplied with power and a regulating system is provided to maintain the current therein independent of the fluctuations in the source that arise from external loading. The regulating system is moreover coupled to the control elements of the main load supply in such manner that the regulations applied to the dummy load are also applied to the main load. The fluctuations which would be superinduced in the dummy load by the variations of the current in the main load are suppressed by providing an additional reactance and resistance in the main load and supplying it with current varying in accordance with the current in the main load. The potential impressed across the latter reactance and resistance is applied as a booster potential in such manner as to compensate for the changes produced in the dummy load by current variations in the main load.

The novel features that we consider characteristic of our invention are set forth with particularity in the appended claims. The invention itself, however, both as to its organization and its method of operation, together with additional objects and advantages thereof, will best be understood from the following description of a specific embodiment, when read in connection with the accompanying drawing, in which the single figure is a diagrammatic view illustrating an embodiment of our invention.

The apparatus shown in the drawing comprises a welding transformer 1, the primary 3 of which is supplied from an alternating current generator 5 through a plurality of discharge devices 7 and 9 connected in anti-parallel. A pair of welding electrodes 11 are connected to the terminals of the secondary 13 of the transformer.

The generator 5 may be regarded as symbolical of an alternating source of any general type. In the preferred practice of our invention, the primary of the welding transformer is connected to the terminals of an ordinary commercial 60 cycle source.

The discharge devices 7 and 9 are preferably of the Ignitron tube type, although mercury pool cathode discharge devices of other types and even hot cathode discharge devices may also be utilized. The latter, of course, are in general applicable where the load demands are not too heavy. Each device 7 and 9 is provided with an anode 15 composed of a solid metal such as iron or nickel or of carbon, a cathode 17 which is customarily, but not necessarily, composed of a mercury pool and an ignition electrode 19 generally composed of a high resistant element such as boron carbide or silicon carbide. Each of the discharge devices 7 and 9 is asymmetrically conductive and by reason of the anti-parallel connection one of them when energized conducts a half cycle of one polarity of the alternating current while the other when energized conducts a half cycle of the opposite polarity. The welding transformer 1 is preferably supplied with an even number of successive half cycles since in this manner, saturation is prevented. It is apparent that in lieu of utilizing separate anti-parallel connected discharge devices a single discharge device having two mercury pools, each of which is provided with an ignition electrode and acts alternately as anode and cathode, may be utilized.

The discharge devices 7 and 9 are capable of carrying considerable current and when either of them is energized, the primary 3 of the welding transformer 1 is substantially directly connected across the line and a heavy current is supplied through the welding electrodes 11 and the material 21 to be welded which is disposed between them by the secondary 13. The operation of a discharge device of the Ignitron type is well known and we need not go into detail in discussing it. Briefly, a discharge is initiated between the anode 15 and the mercury pool cathode 17 when a current of predetermined magnitude flows through the ignition electrode 19 and the cathode. It is apparent that the ignition electrode 19 may cooperate with a pool of mercury or a deposit of other metal which is separate from the cathode.

For a number of reasons which need not be enumerated here, better welds are produced by supplying current intermittently to a material to be welded than by supplying continuous current. Of course, in spot welding, the current is necessarily supplied intermittently. The intermittent application of welding heat to the material 21 may be timed by alternately permitting a number of successive half cycles of current to flow and then restraining the flow for a subsequent number of successive half periods. Further by varying the phase point in each half cycle at which the current supplied to the welding transformer 1 is initiated, the magnitude of the current, and therefore the amount of heat supplied to the welding material may be varied.

Our invention is applicable to electric welding processes of all types and has particular utility in seam welding and spot welding apparatus. In all cases the supply of current to the welding transformer 1 is controlled by controlling the supply of current through the ignition electrodes 19 and the cathodes 17 of the discharge devices 7 and 9.

It is to be noted that while our invention is illustrated as applied to a system in which the welding current is supplied directly through the discharge devices 7 and 9, it is equally as well applicable to a system in which the welding current is supplied through a series transformer in the secondary of which the discharge devices are connected. When the discharge devices are energized, the secondary is in effect short-circuited and a large current passes through the primary of the series transformer. To control the timing of the supply of ignition current to each of the discharge devices 7 and 9, auxiliary discharge devices 23 and 25 are provided in each of the ignition circuits. Each auxiliary discharge device 23 and 25 has an anode 27, a hot cathode 29 and a control electrode 31 and is preferably of the gaseous type, although on occasions high vacuum discharge devices may be utilized. The auxiliary discharge devices 23 and 25 are connected in anti-parallel in a manner analogous to the main discharge devices 7 and 9 respectively with which they are associated. The principal circuit of one of the discharge devices 23 extends from the lower terminal 33 of the generator 5 through a conductor 35, a resistor 37, the anode 27 of the auxiliary discharge device, the cathode 29 of the auxiliary discharge device, a conductor 38 the ignition electrode 19 of the corresponding main discharge device 7, the cathode 17 of the corresponding main discharge device, the primary 3 of the welding transformer 1 to the other terminal 39 of the generator. The circuit of the other auxiliary discharge device 25 extends from the last-mentioned terminal 39 of the generator 5 through the primary 3 of the welding transformer 1, a resistor 41, the anode 27 of the discharge device 25, the cathode 29 of the discharge device, a conductor 43, the ignition electrode 19 of the associated main discharge device 9, the cathode 17 of the associated main discharge device, conductor 35 to the other terminal 33 of the generator.

In the embodiment of our invention which is illustrated herein, the auxiliary discharge device 23 and 25 associated with each of the main discharge devices 7 and 9 is shown as controlled by the operation of a system which is specifically disclosed in a copending application, Serial No. 59,402, filed January 16, 1936 to John W. Dawson, since matured into Patent No. 2,081,987, dated June 1, 1937, and assigned to the Westinghouse Electric & Manufacturing Company. Briefly described, this system comprises a rectangular magnetic core 45 provided with a plurality of windings 47, 49, 51 and 53. The windings are grouped in series connected pairs 47 and 49 and 51 and 53. Winding 47 is wound on the upper portion of one leg 55 of the core 45 while winding 49 is wound on the lower portion of the opposite leg 57. Similarly winding 51 is wound on the upper portion of the leg 57 while winding 53 is wound on the lower portion of the leg 55. One terminal of the series connected pair of windings 47 and 49 is connected to the control electrode 31 of one of the auxiliary discharge devices 23 while the other terminal of the same pair is connected to the cathode 29 of the discharge device through a suitable biasing potential supplied from the generator 5 through a secondary section 59 of a transformer 61 and a rectifier 63 of suitable character. One terminal of the other set of windings 51 and 53 is connected to the control electrode 31 of the other auxiliary discharge device 25 while the other terminal is connected to the cathode 29 through a biasing potential derived from the source through a secondary section 65 of transformer 61 and a rectifier 67. To stabilize the potential impressed between the control electrode 31 and the cathodes 29 of the auxiliary discharge devices, capacitors 69 and 71 are connected between the electrodes 29 and 31 in each case.

The core 45 is provided with an air gap 73 into which a plurality of pins 75 of magnetic material mounted on a disc 77 project as the disc is rotated by a synchronous motor 79. As the disc 77 rotates and the pins 75 move in the gap 73 of the core 45, impulses are induced in the pairs of windings 47 and 49 and 51 and 53 connected in the control circuits of each of the auxiliary discharge devices 23 and 25. The impulses are of such polarity that in each case, the potential impressed between the control electrode 31 and the cathode 29 of the discharge device 23 or 25 is sufficient to energize the discharge device if the potential between the corresponding anode 27 and cathode 29 is of proper polarity. Since the anode cathode potential of the discharge devices 23 and 25 are alternately of opposite polarity, at any instant at which a pin 75 passes through gap 73. Current flows through one of the discharge devices 23 or 25, its associated resistor 37 or 41 and the starting electrode 19 and cathode 17 of the associated main discharge device 7 or 9. The associated main discharge device 7 or 9 is thus prepared for excitation.

The disc 77 is customarily rotated at such a speed that the movement of the pins 75 through the gap 73 corresponds to the cyclic variation of the source. The customary practice is to move one pin 75 through the gap 73 during each half period of the source. The pins 75 are removably mounted in the disc 77 and by suitably spacing them around the periphery of the disc, the auxiliary discharge devices 23 and 25 may be made to pass current during any desired set of half cycles.

It is to be noted at this point that while our invention is shown herein as embodied in a system incorporating a disc with removable pins mounted therein which automatically times the excitation of the auxiliary discharge devices, the use of a device of this specific type is not essential to the practice of our invention, since the particular system utilized to energize the auxiliary discharge devices does not essentially concern our invention. Thus, our invention may be equally as well applied to a system in which the auxiliary discharge devices 23 and 25 and, therefore, the main discharge devices 7 and 9 are manually excited at random, as is the case, for example, where the operator presses a trigger or a foot switch to produce a spot weld or a series of spot welds.

To ignite the main discharge devices 7 and 9, current of at least a predetermined magnitude must be transmitted through the ignition electrodes 19 and the cathodes 17. It will be noted that in the circuits of the auxiliary discharge devices 23 and 25 resistors 37 and 41 are incorporated. The resistors are advisedly added to the system and are of such magnitude that the current through the auxiliary discharge devices 23 and 25 and the resistors is not of sufficient magnitude in itself to cause the corresponding main discharge devices 7 and 9 to become energized. To produce excitation of the main discharge devices, the resistors 37 and 41 are short circuited by additional auxiliary discharge devices 81 and 83 connected across their terminals. The purpose of utilizing two sets of discharge devices 23 and 25 and 81 and 83 will become apparent when it is recalled that our practice is to time the welding by transmitting a number of successive half cycles of current through the material to be welded and to control the heat supplied to the material for welding purposes by controlling the phase point in each of the successive half cycles at which the discharge devices are ignited. As is apparent from the foregoing observations, the auxiliary discharge devices 23 and 25 in cooperation with the rotating disc 77 and the pins 73 inserted therein operate to time the welding and determine the number of successive half cycles of current that is to be transmitted through the material 21; the other auxiliary discharge devices 81 and 83 that short circuit the resistors 37 and 41 determine the phase points in each of the successive half cycles at which the main discharge devices 7 and 9 are energized.

Each of the latter discharge devices 81 and 83 is provided with an anode 84, a hot cathode 85 and a control electrode 87 and is preferably of the gaseous type. Potential for controlling the excitation of the discharge devices 81 and 83 and determining the instant in the half periods of the main generator supply at which they are energized is provided by a transformer 91 having a single primary 93 and a plurality of secondaries 95, 97, 99 and 101. Two of the secondaries 95 and 97 are connected respectively between the control electrode 87 and the cathode 85 of each of the auxiliary discharge devices 81 and 83. To stabilize the control potential supplied to the latter discharge devices, capacitors 103 and 105 are connected between the control electrodes and the cathodes.

The control potential is so supplied to the auxiliary discharge devices 81 and 83 that the supply of current to the primary 3 of the welding transformer 1 through the main discharge devices 7 and 9 is independent of fluctuations of the potential output of the generator 5. This object is accomplished by adjusting the phase of the control potential supplied to the auxiliary discharge devices 81 and 83 in accordance with the regulation requirements of a dummy load circuit 107 connected in parallel with the main load. The dummy load circuit 107 is a network comprising essentially a resistor 109 and a reactor 111, the ratio of the magnitudes of which is the same as the ratio of the magnitudes of the resistance and the reactance of the portion of the apparatus consisting of the welding transformer 1 and the associated electrodes 11. The desired ratio may be obtained by simply measuring the power factor of the welding transformer 1. We have found that this measurement yields a sufficiently accurate value for most purposes. For more accurate adjustment our practice is to provide the resistor 109 in the dummy network with a movable tap 113 which short-circuits a portion of the resistor.

The reactor 111 and the resistor 109 of the dummy network 107 are preferably connected in series with each other. The remaining terminal of the reactor 111 is connected to the terminal 39 of the generator 5 through another set of impedances comprising a second reactor 115 and a second resistor 117. The impedances 115 and 117 are preferably low as compared to the impedances 109 and 111 since it is desirable that they disturb the power factor of the network 109—111 as little as possible. The remaining terminal of the resistor 109 is connected to the other terminal 33 of the generator 5 through a fourth set of discharge devices 119 and 121 connected in anti-parallel in a manner analogous to that in which the main discharge devices 7 and 9 are connected.

The discharge devices 119 and 121 generally correspond in their properties to the main discharge devices 7 and 9. They are each provided with an anode 123, a hot cathode 125 and a control electrode 127 and are preferably of the gaseous type. While the current transmitted by the discharge devices 119 and 121 may be comparatively small, it is important that the drop in potential between the anodes 123 and the cathodes 125 should be of substantially the same order of magnitude as the arc drop in the main discharge devices 7 and 9. As the discharge devices in the dummy network 107 are successively energized, current of one polarity and the opposite polarity is successively transmitted through the dummy network in substantially the same manner as it is transmitted through the welding transformer when the main discharge devices 7 and 9 are energized.

Potential is impressed between the control electrodes 127 and the cathodes 125 of the discharge devices 119 and 121 in the dummy network 107 from the remaining secondary sections 99 and 101 of the control transformer 91. The secondary sections 99 and 101 associated with the dummy network discharge devices 119 and 121 are similar to the secondary sections 95 and 97 associated with the auxiliary discharge devices 81 and 83. It is to be noted, moreover that the anode and cathode potentials impressed on the discharge devices 81 and 83 when the discharge devices 23 and 25 respectively are energized substantially equivalent to the output potential of the source 5 and therefore to the anode cathode potentials impressed on discharge devices 119 and 121. The discharge devices 81 and 83 and 119 and 121 are so selected and the potentials delivered by the secondary sections 95, 97, 99 and 101 are of such magnitude that when the discharge devices 23 and 25 are energized, the corresponding discharge devices 81 and 83 respectively are energized at the same phase points in the half-cycles as the discharge devices 119 and 121 respectively. Since the main discharge devices 7 and 9 are energized substantially simultaneously with the auxiliary discharge devices 81 and 83, respectively, the discharge devices 7 and 9 are thus energized at the same phase points in the half-cycles as the discharge devices 119 and 121.

The energizing control potential is supplied to the discharge devices 119 and 121 of the dummy network 107 in such manner that the current transmitted through the dummy network is substantially independent of the potential fluctuations of the generator 5. This object is accomplished by properly adjusting the phase of the potential supplied to the primary 93 of the control transformer 91 relative to the potential of the generator 5 and thus adjusting the phase points in the potential of generator 5 at which the discharge devices 119 and 121 are energized.

The phase adjustment is predetermined by the operation of a regulator system supplied with energy from a transformer 129 the primary 131 of which is connected across the resistor 109 in the dummy load. One secondary section 133 of the transformer 131 is connected to the input terminals of a bridge rectifier 135. The direct current output of the rectifier 135, is supplied between the anode 137 and the cathode 139 of a regulator tube 141 through a suitable variable resistor 143. To smooth out fluctuations in the potential a capacitor 145 is connected across the output terminals of the rectifier.

The regulator tube 141 is a high vacuum discharge device of the hot cathode type which is operated in the saturation region. The output current of the tube is varied by varying the heating current supplied to the cathode. Accordingly, the rectified potential supplied between the anode 137 and the cathode 139 of the regulator tube 141 is so adjusted that the tube operates in the saturation region. The cathode 139 of the tube is moreover supplied with current which varies in accordance with the variation of the current in the dummy network 107. The cathode energizing current is obtained from a potentiometer 147 connected across another secondary section 149 of the transformer 129. For any variation in the potential output of the generator 5, the current through the dummy network resistor 109 tends to vary and the current through the regulator tube 141 and its associated circuit varies. The varying current produces a varying potential drop across the resistor 143 connected in series with the anode 137. The varying potential drop is impressed between the cathode 151 and the control electrode 153 of a further high vacuum discharge device 155 by connecting a movable tap 157 of a potentiometer 159, connected across the rectifier network 135 to the cathode 151 and the anode 137 of the regulator tube 141 to the control electrode 153 of the high vacuum discharge devices. The anode circuit of the high vacuum discharge device 155 is supplied with potential, a further rectifying network 161 which is in turn energized from the main source through a suitable transformer 163. The primary 165 of the transformer 163 is connected in the usual manner across the terminals of the generator 5. One terminal of the secondary 167 is connected directly to one input terminal of the rectifying network 161 while the other terminal of the secondary is connected to the other input terminal of the network through a capacitor 169.

The secondary 167 of the transformer 163 is provided with an intermediate tap 171 which is in turn connected to one terminal of the primary 93 of the control transformer 91. The other terminal of the primary of the control transformer is connected to the junction point 173 of the capacitor 169 and the rectifying network 161.

The rectifying network 161 functions in effect as an alternating current resistor in the circuit including the secondary 167 of the transformer 163 and the capacitor 169. As the control potential applied to the high vacuum discharge device 155 is varied, the current drawn by the discharge device varies and therefore the effective alternating current resistance of the rectifying network 161 varies. Moreover, as the resistance varies the phase of the potential impressed between the junction point 173 and the intermediate tap 171 is shifted relative to the potential of generator 5. The control transformer 163 is therefore supplied with potential which shifts in phase in accordance with the variations in the output of discharge device 155 and therefore in accordance with the variation in the output current of regulator tube 141.

The secondary windings 99 and 101 of the control transformer 91 are so connected in the control circuits of the discharge devices 119 and 121 of the dummy network 107 that the phase shift tends to suppress the variations in current in the dummy network. When the potential of generator 5 decreases the discharge devices 119 and 121 are energized earlier in the half-cycles, when the potential increases the discharge devices are energized later in the half-cycles. The current through the dummy network is accordingly maintained substantially independent of the fluctuations in the generator potential.

The main discharge devices 7 and 9, when they are energized are energized substantially at the same phase points in the half-cycles as are the corresponding discharge devices 119 and 121. Since the discharge devices 7 and 9 are connected in parallel with the discharge devices 119 and 121 the generator potential charge which occurs for the former also occurs for the latter and the connection which is made to maintain the dummy load current constant will also tend to maintain the main load current constant.

It is to be noted that while our preferred practice is to so adjust the potentials applied to the discharge devices 81 and 83 and 7 and 9 that they are energized substantially at the same time as the discharge devices 119 and 121, this arrangement is not indispensible. It is only necessary that there be some correspondence between the instants when the latter are energized and the instants when the former are energized and that this correspondence be such that the welding current is uniform. Accordingly it may happen that the discharge devices 81 and 83 and 7 and 9 are energized later or earlier in the successive cycles than the discharge devices 119 and 121.

The current supplied to the welding transformer 1 is comparatively large and when it flows the terminal potential of the generator 5 tends to drop in turn producing an abrupt variation in the potential supplied to the dummy network 107. It is to suppress this abruptly varying potential arising from variations in the load current that the additional reactor 115 and resistor 117 are utilized. The reactor 115 and the resistor 117 are so selected that their ratio is equal to the ratio of the line and generator reactance to the line and generator resistance.

The reactor 115 and the resistor 117 are connected in series with each other and the terminals of the series network thus formed are connected respectively to a fixed terminal 175 and a variable tap 177 of a booster current transformer 179. The transformer 179 is supplied from the generator 5 when current is transmitted through the welding transformer 1. The polarity of the current transformer 179 is such that the potential drop across the resistor 117 and the reactor 115 has a polarity boosting the potential derived from the generator 5 by an amount corresponding to the current flow through the line. The magnitude of the potential is so adjusted that the variations in the generator output produced by the variations in load current are suppressed in the dummy network 107.

The operation of the compensating network may be better explained by an illustrative example. Assume that when the main discharge devices 7 and 9 are deenergized, the lower terminal 33 of the generator 5 is at a potential of zero volts and the upper terminal 39 of the generator is at a potential of 100 volts. Since no current is flowing through the line, the current transformer does not supply potential to the compensating network. Accordingly, the potential drop across the dummy network 107 is 100 volts minus the potential drop across the compensating network 115—117, which we may assume to be say 1 volt or 99 volts. When the main discharge devices 7 and 9 are energized, current flows through the line and the potential output of the generator drops to say 90 volts. Accordingly, the upper terminal 39 of the generator 5 is now 90 volts and in the absence of any booster potential supplied by the current transformer 179, the potential drop across the dummy network 107 would be 89 volts. However, since the current transformer is now energized, current is supplied to the compensating network and the impedance of the compensating network is so adjusted that the potential drop across it is 10 volts raising the potential of the right-hand point of the dummy network to 99 volts, i. e., to the value which it originally had.

Although we have shown and described certain specific embodiments of our invention, we are fully aware that many modifications thereof are possible. Our invention, therefore is not to be restricted except insofar as is necessitated by the prior art and by the spirit of the appended claims.

We claim as our invention:

1. Apparatus for regulating the supply of power from a source to a load comprising a network having electrical properties corresponding to the electrical properties of said load, said network having a corresponding electrical property for substantially every electrical property of said load, means for coupling said network to said source in a manner corresponding to that in which said load is coupled to said source and means responsive to variations in said network that arise by reason of variations in the output of said source for controlling the supply of power to said load.

2. The method of regulating the supply of power from a source to a load of the type that is intermittently energized with apparatus including a network having electrical properties corresponding to the electrical properties of said load which comprises the steps of continuously supplying said network with power from said source and at all times varying the possible supply of power to said load in accordance with the variations of the power supplied to said network.

3. Apparatus for controlling the supply of power from a source to a load comprising a network, having electrical properties corresponding to the properties of said load, supplied from said source, means for regulating the supply of power to said network and means coupled to said regulating means for applying the regulation of said regulating means to said load.

4. Apparatus for controlling the supply of power from a source to a load of the type that is energized intermittently comprising a network, having electrical properties corresponding to the properties of said load, continuously supplied from said source, means for regulating the supply of power to said network and means coupled to said regulating means for applying the regulation of said regulating means to said load.

5. Apparatus for controlling the supply of power from a source to a load comprising at least one discharge path having a control element connected between said source and said load, a network having electrical properties corresponding to the properties of said load and including at least another discharge path having a control element, corresponding in its properties to said first-named discharge path and connected in said network in a manner to correspond to the connection of said first-named discharge path with said load, means cooperating with the control element of said last-named discharge path for regulating the supply of power to said network and means for coupling said regulating to the control element of said first-named discharge path to apply the regulation of said regulating means to said load.

6. Apparatus for controlling the supply of power from a source to a load comprising at least one discharge path having a control element and connected between said source and said load to operate as a valve to increase and decrease the supply of current from said source to said load, a network having electrical properties corresponding to the properties of said load and including at least another discharge path having a control element, connected between said source and said network to operate as a valve to increase and decrease the supply of current from said source to said network, means cooperative with the control element of said last-named discharge path for regulating the flow of current through said network and means for coupling said regulating means to said first-named discharge path to control the current supplied to said load.

7. Apparatus for controlling the supply of power from a source to a load comprising current conducting and interrupting means for permitting current to pass and restraining current between said source and said load, a network having electrical properties corresponding to those of said load, said network having a corresponding electrical property for substantially every property of said load and means responsive to the electrical condition of said network for controlling the operation of said current conducting and interrupting means.

8. Apparatus for controlling the supply of power from a source to a load comprising current conducting and interrupting means for permitting current to pass and restraining current between said source and said load, a network having electrical properties corresponding to those of said load, means for regulating the current flow through said network to maintain it substantially uniform, and means responsive to said regulating means for controlling the operation of said current conducting and interrupting means.

9. Apparatus for controlling the supply of power from a source to a load comprising current increasing and decreasing means between said source and said load, control means for said current increasing and decreasing means operating intermittently to provide increased current through said load whereby said load is provided with increased current during certain intervals and decreased current during certain other intervals, a network having electrical properties corresponding to those of said load and means responsive to the electrical condition of said network for controlling the operation of said current increasing and decreasing means.

10. Apparatus for controlling the supply of power from a source to a load comprising current increasing and decreasing means between said source and said load, control means for said current increasing and decreasing means operating intermittently to provide increased current through said load whereby said load is provided with increased current during certain intervals and decreased current during certain other intervals, a network having electrical properties corresponding to those of said load and means responsive to the electrical conditions of said network for controlling the operation of said current increasing and decreasing means during one set of said intervals.

11. Apparatus for controlling the supply of power from a source to a load comprising current increasing and decreasing means between said source and said load, control means for said current increasing and decreasing means operating intermittently to provide increased current through said load whereby said load is provided with increased current during certain intervals and decreased current during certain other intervals, a network having electrical properties corresponding to those of said load and means responsive to the electrical condition of said network for controlling the operation of said current increasing and decreasing means during said intervals during which said load is supplied with increased current.

12. Apparatus according to claim 9 characterized by means in the network operating to compensate for the effect on the network of the change in the current through the load.

13. Apparatus for controlling the supply of power from a source to a load comprising at least one discharge path having a control element and connected between said source and said load to operate as a valve to increase and decrease the supply of current from said source to said load, control means cooperative with said control element for causing said discharge path to permit the passage of a current of a certain magnitude at times and a current of substantially smaller magnitude at other times, a network having electrical properties corresponding to the properties of said load and including at least another discharge path having a control element, connected between said source and said network to operate as a valve to increase and decrease the supply of current from said source to said network, means cooperative with the control element of said last-named discharge path for regulating the flow of current through said network to maintain it substantially uniform at all times and means for coupling said regulating means to the control element of said first-named discharge path to control the current supplied to said load.

14. Apparatus according to claim 6 characterized by the fact that the first-named discharge path has a cathode of the mercury pool type and the last-named discharge path has a hot cathode and a gaseous atmosphere, the pressure of said gaseous atmosphere being such that the potential drop across a discharge in said last-named device is substantially equivalent to the potential drop across a discharge in said first-named device.

15. Apparatus according to claim 6 characterized by means for compensating for the influence on the network of variations in the current flow through the load.

16. Apparatus for controlling the supply of power from a periodic source to a load comprising an electric discharge device having a control electrode and plurality of principal electrodes, means for impressing a potential from said source between said principal electrodes, means for impressing potentials between said control electrode and one of said principal electrodes of such magnitudes that at times said discharge device is energized and at other times it is deenergized, a network having electrical properties corresponding to the properties of said load and including another discharge device having a control electrode and a plurality of principal electrodes, corresponding to said first-named discharge device, correspondingly connected between said network and said source, whereby a potential is supplied from said source between the principal electrodes of said last-named discharge device, means for impressing a potential between said control electrode and one of the principal electrodes of said last-named discharge device to maintain said last-named discharge device energized and means for simultaneously and to corresponding extents varying the phase relationship of principal and control potentials of said first-named and last-named discharge devices.

17. The method of regulating the current for welding materials by supplying to the materials intermittently current impulses of large magnitude with apparatus of the type including a network corresponding in its electrical properties to the welding circuit which comprises the steps of regulating the current through the network to maintain it uniform and controlling the welding current in accordance with the regulation of said network.

18. Apparatus for supplying current from a source to a welding circuit of the type wherein the welding is produced by supplying current impulses of large magnitude intermittently comprising a network having electrical properties corresponding to those of the welding circuit, means for supplying said network with current from said source, means for regulating the current supplied to said network and means responsive to said regulating means for controlling the current supplied to said welding circuit.

19. Apparatus according to claim 18 characterized by the fact that the network includes means for compensating for the effect in the network of the variations arising from the initiation and interruption of the welding current.

20. Apparatus for regulating the supply of power from a source to a load having reactance and resistance comprising a network having reactance and resistance so dimensioned that the power factor of said network is substantially equal to the power factor of said load, means for coupling said network to said source in a manner corresponding to that in which said load is coupled to said source and means responsive to variations in said network that arise by reason of variations in the output of said source for controlling the supply of power to said load.

21. Apparatus for controlling the supply of power from a source to a welding load of the type that is energized intermittently comprising a network, having electrical properties corresponding to the properties of said load, continuously supplied from said source, means for regulating the supply of power to said network and means coupled to said regulating means for applying the regulation of said regulating means to said welding load.

22. Apparatus for supplying current from a source to a welding circuit of the type wherein the welding is produced by supplying current impulses of large magnitude intermittently comprising a network, having substantially the same power factor as the welding circuit, means for supplying said network with current from said source, means for regulating the current supplied to said network and means responsive to said regulating means for controlling the current supplied to said welding circuit.

23. In combination, a source of power, a main load having reactance and resistance, means including electric discharge means for supplying said load from said source, a dummy load having reactance and resistance to correspond to that of said main load and means including electric discharge means corresponding to said first mentioned electric discharge means for supplying said dummy load from said source.

24. In combination, a source of alternating current a main load having reactance and resistance, means including a pair of anti-parallel connected electric discharge paths for supplying alternating current to said load from said source, a dummy load having reactance and resistance to correspond to that of said main load and means including a pair of anti-parallel connected discharge paths corresponding to said first mentioned electric discharge paths for supplying alternating current to said dummy load from said source.

25. Apparatus for supplying current from a source to a circuit of the type wherein current impulses of large magnitude are intermittently supplied comprising a network, having substantially the same power factor as the circuit, means for supplying said network with current from said source, means for regulating the current supplied to said network and means responsive to said regulating means for controlling the current supplied to said circuit.

26. Apparatus for controlling the supply of power from a source to a load comprising a network, having electrical properties corresponding to the properties of said load, supplied from said source, means for adjusting the supply of power to said network and means coupled to said adjusting means for applying the adjustment of said adjusting means to said load.

FINN H. GULLIKSEN.
JOHN W. DAWSON.